A. O. SCHOELCH.
PNEUMATIC SPRING WHEEL.
APPLICATION FILED JAN. 31, 1914.
1,096,959.
Patented May 19, 1914.
2 SHEETS—SHEET 1.
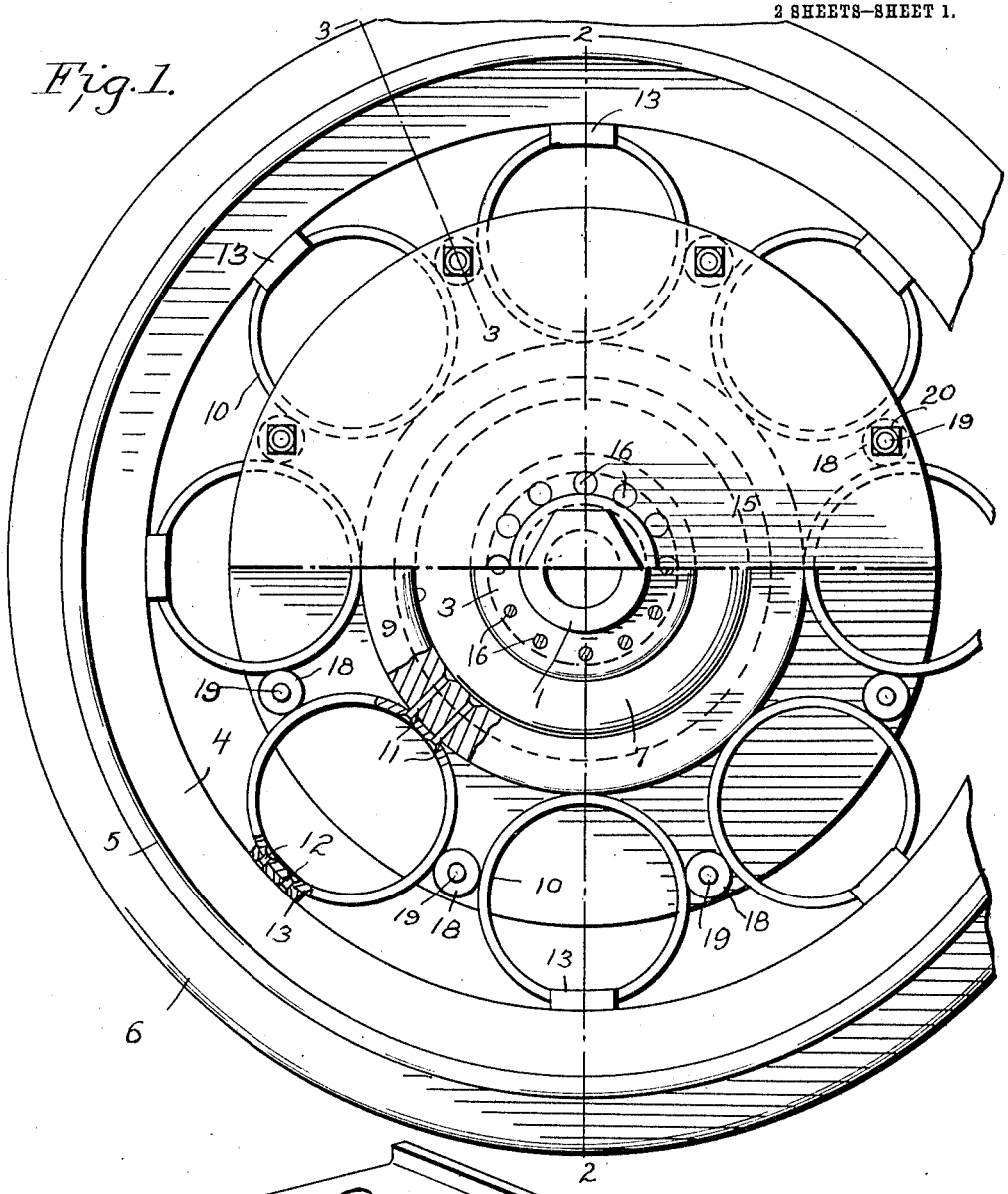
Fig. 1.
Fig. 4.
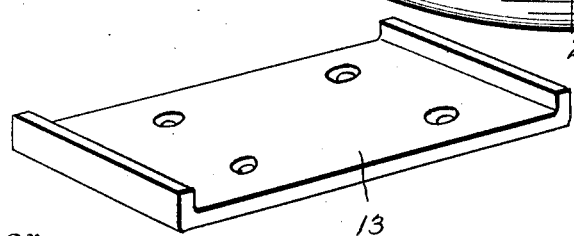
Witnesses
Inventor
A. O. Schoelch.
By
Attorney

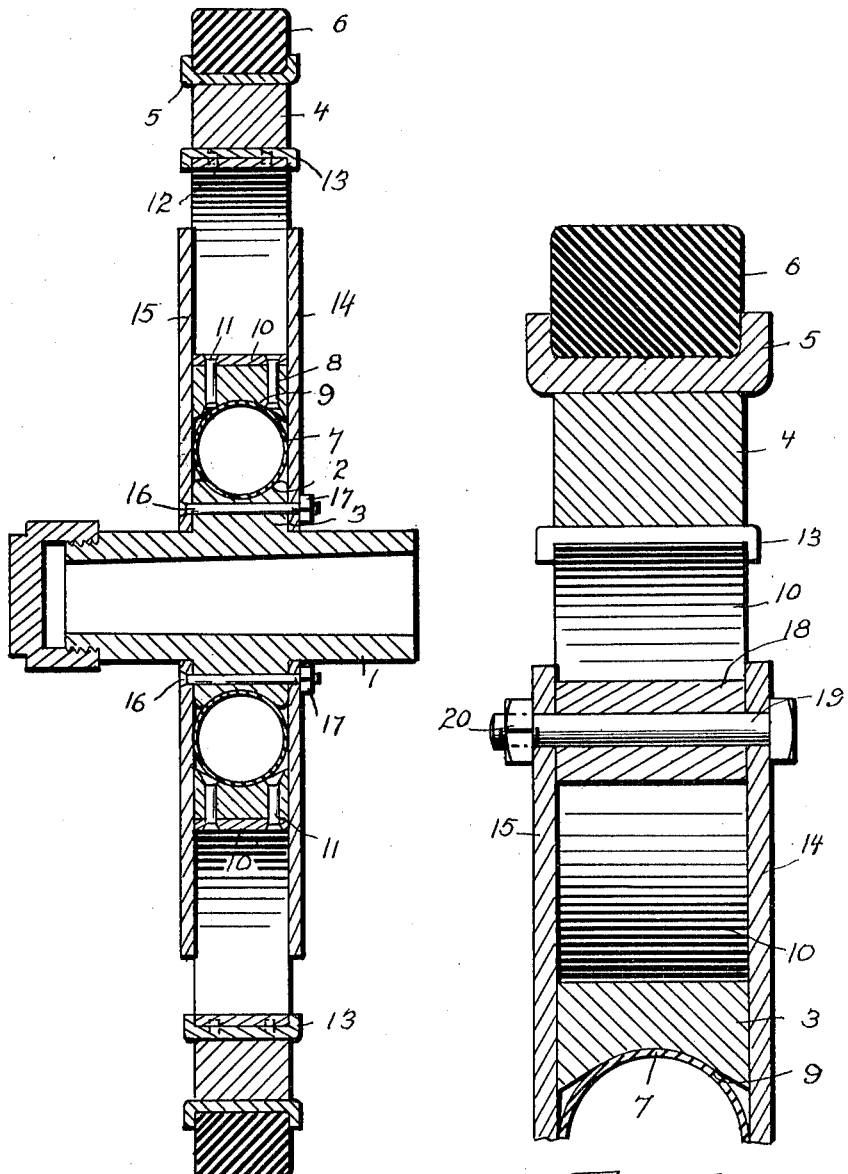

UNITED STATES PATENT OFFICE.

ALBERT O. SCHOELCH, OF SHELBYVILLE, INDIANA.

PNEUMATIC SPRING-WHEEL.

1,096,959.  Specification of Letters Patent.  Patented May 19, 1914.

Application filed January 31, 1914. Serial No. 815,634.

*To all whom it may concern:*

Be it known that I, ALBERT O. SCHOELCH, a citizen of the United States, residing at Shelbyville, in the county of Shelby and State of Indiana, have invented certain new and useful Improvements in Pneumatic Spring-Wheels; and I do hereby declare the following to be a full, clear, and exact description of the invention, such as will enable others skilled in the art to which it appertains to make and use the same.

My invention relates to new and useful improvements in vehicle wheels and resides in the provision of a novel form of spring wheel that will permit the use of solid rubber tires in connection therewith and provide the desired resiliency such as obtained with the use of pneumatic tires thus dispensing with punctures and other tire troubles and affording comfort to the occupants of the vehicle.

An important object of my invention is to provide a spring wheel of the character described which consists of a wheel comprising a hub and rim between which are interposed a plurality of springs which serve as spokes, said springs being arranged to coöperate with a pneumatic tube that is arranged circumferentially of the hub thus providing a great amount of resiliency.

Another important object of my invention is to provide a spring wheel of the character described which is simple as to construction, consists of few parts, capable of being readily attached to vehicles of all characters and which is cheap to manufacture.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a side elevation showing a portion of my spring wheel in assembled position, Fig. 2 is a vertical sectional view taken on line 2—2 of Fig. 1, Fig. 3 is a sectional view taken on line 3—3 of Fig. 1, and Fig. 4 is a detail perspective view of one of the spring securing plates.

Referring to the drawings by characters of reference, the numeral 1 designates as an entirety a hub having a concaved periphery 2 formed in the circumferential flange 3 which consists of the body portion of the hub, and the numeral 4 designates a rim having a metallic tire securing band 5 thereon in which is mounted a solid rubber tire 6.

Mounted within the concaved portion 2 of the rim flange 3 is a circumferential rubber tube 7 which is adapted to be inflated. A circular band 8 is disposed with its concaved face 9 in engagement with the outer portion of the tube 7.

A plurality of flat circular springs 10 are arranged arcuately about the hub 1 between the band 8 and rim 4. These springs 10 are secured by suitable fastening means 11 at their inner extremities to the circular band 8 upon the outer face thereof, and at their outer extremities are secured by suitable fastening means 12 to U-shaped securing plates 13 that are carried upon the inner face of the rim 4. These springs 10 are arranged in spaced relation to each other and are held in such position by means which will be later more fully described.

The springs 10, circular band 8, tube 7 and rim flange 3 are all of preferably the same width and are held in coöperative relation relative to each other by means of side plates 14 and 15. These side plates 14 and 15 are provided with a central opening to receive the extended portions of the hub 1 and are mounted upon the hub upon opposite sides thereof with their inner faces in engagement with the tube 7, band 8 and inner extremities of the springs 10. These plates 14 and 15 are preferably of a circular form and are spaced at their peripheries from the inner face of the rim 4. A plurality of bolts 16 are inserted through the central portion of the plates and the hub flange 3 and have nuts 17 turned upon their threaded terminals. These bolts 16 are arranged arcuately about the hub and serve to hold the plates securely thereon.

As a means for securing the plates to each other, increasing the efficiency of the springs and spacing the springs from each other, there has been provided between the springs friction rollers 18 of preferably the same length as the width of the springs 10. These rollers 18 are formed of some suitable fibrous material preferably, and are mounted for rotation transversely of the plates 14 and 15 upon bolts 19 that are inserted through the plates 14 and 15 adjacent the peripheries thereof and have nuts 20 turned upon their unheaded terminals. The bolts 19 serve to connect the plates 14 and 15 and securely hold them in operative position. The rollers 18 in being arranged in engagement with the springs increase the resilient action thereof and in general add more resiliency to the wheel.

The device may be readily assembled and disassembled as will be clearly seen with reference to the foregoing description and accompanying drawings.

Suitable means may be employed for permitting the inflation of the tube 7 and it is not thought necessary to illustrate this means in this connection.

The combination of the pneumatic tube with the springs enables the construction of a wheel which will provide greater resiliency than is the case with the wooden spoke wheel and at the same time enables the use of solid rubber tires thus eliminating tire trouble.

In constructing the wheel it has been found preferable to use light metal where possible such as aluminum thus maintaining a low weight of the wheel.

The side plates 14 and 15 serve to hold the mechanism, namely the springs and tube in the proper coöperative relation to each other and prevent any lateral movement of the rim relative to the hub.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. A pneumatic spring wheel comprising a hub, a rim spaced therefrom, a pneumatic tube arranged circumferentially of and upon said hub, a circular band mounted upon the outer face of said tube, a plurality of spaced circular flat springs secured to said band and the ring, a pair of side plates secured upon the hub and engaging the tube, band and springs, and rollers arranged between and in engagement with the springs and mounted transversely of and secured to said side plates.

2. A pneumatic spring wheel comprising a hub, a rim spaced therefrom, a circular pneumatic tube mounted upon said hub, a circular band mounted upon said tube, a plurality of circular flat springs secured to the inner face of said rim and outer face of said band, said springs being arranged in spaced relation to each other, means for holding said springs, band and tube in coöperative relation with each other, and rollers carried by said last named means and arranged between and in engagement with said springs.

3. A pneumatic spring wheel comprising a hub, a rim, a pneumatic tube mounted upon said hub, a circular band mounted upon said tube, springs arranged between the band and rim, and secured to said band and the rim, anti-friction means mounted between said springs, and means for holding said springs, band and tube in coöperative relation to each other, mounted upon said hub.

In testimony whereof I affix my signature in presence of two witnesses.

ALBERT O. SCHOELCH.

Witnesses:
JOSEPH BEYER, Jr.,
DALE E. PHERIGO.